United States Patent
Garnier et al.

(10) Patent No.: US 6,354,597 B1
(45) Date of Patent: Mar. 12, 2002

(54) SEALED ROTATING CONNECTION DEVICE ALLOWING GREAT MOTIONS

(75) Inventors: Dominique Garnier, Orgeval; Jean Morlec, Saint Nazaire, both of (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 09/448,510

(22) Filed: Nov. 24, 1999

(30) Foreign Application Priority Data

Nov. 26, 1998 (FR) ............................................ 98 14934

(51) Int. Cl.7 ................................................ F16J 15/16
(52) U.S. Cl. ........................ 277/508; 277/520; 277/523
(58) Field of Search ................................ 277/503, 504, 277/508, 522, 516, 396, 327, 329, 523; 165/9, 179, DIG. 21, DIG. 20, DIG. 24

(56) References Cited

U.S. PATENT DOCUMENTS

| 1,506,420 A | * | 8/1924 | Flaspoehler et al. |
| 2,486,939 A | * | 11/1949 | Freund |
| 2,608,424 A | * | 8/1952 | Everett |
| 3,638,956 A | * | 2/1972 | Dagwell |
| 3,735,810 A | * | 5/1973 | Ostbo ........................ 165/142 |
| 3,822,739 A | * | 7/1974 | Kurschner ..................... 165/9 |
| 4,408,769 A | * | 10/1983 | Wolff |
| 4,795,171 A | * | 1/1989 | Quevedo Del Rio |
| 5,171,022 A | * | 12/1992 | Fessmann |
| 5,643,538 A | * | 7/1997 | Morlec et al. ............... 422/173 |
| 5,820,836 A | * | 10/1998 | Morlec et al. ............... 423/210 |

FOREIGN PATENT DOCUMENTS

| AU | 17601 | 8/1968 | |
| DE | 937265 | 12/1955 | |
| FR | 2755493 | 5/1998 | ........... F16L/27/02 |

* cited by examiner

*Primary Examiner*—Anthony Knight
*Assistant Examiner*—Alison K. Pickard
(74) *Attorney, Agent, or Firm*—Antonelli, Terry, Stout & Kraus, LLP

(57) ABSTRACT

A rotating connection device forming a seal between an inner element (1) and an outer element (14) of larger diameter than the inner element, these two elements being co-axial, cylindrically symmetric and rotating in relation to one another. It comprises a shell (16) placed in the annular space between the two elements, at least a first ring-type seal (19) secured to the shell, placed between the latter and inner element (1), at least a second ring-type seal (23) placed between two opposite walls (22, 18) of shell (16) and of outer element (14), both perpendicular to the axis of rotation, and means (24–26) for pressing the two walls against one another by means of the ring-type seal with an adjustable application force. This connection device allows substantial motions between the two elements, radial as well as longitudinal. The device can be used: for example for connecting a pipe linking an outer device and the central part of the rotating ring gear of a heat exchange and/or incineration system.

4 Claims, 3 Drawing Sheets

SEALED ROTATING CONNECTION DEVICE ALLOWING GREAT MOTIONS

BACKGROUND OF THE INVENTION

1. Field of the Invention

The present invention relates to a rotating connection device forming a seal between two cylindrically symmetric elements rotating in relation to one another, that allows relatively substantial motions between the elements. The device according to the invention is particularly well-suited when the sections of the elements fitting into each other are relatively large.

2. Description of the Prior Art

A known method of connecting an end of a rotating tubular element 1 to an end box 2 is diagrammatically illustrated in FIG. 1. The terminal part of tube 1 is externally secured to a bellows 3 ended by an annular end plate 4. The annular plate 4, rotating with tubular element 1, is in contact, on the opposite faces thereof, with annular gaskets 5 pressed onto the plate 4 by springs 6 lodged in cavities provided in end box 2. A pipe 7, opening into box 2, communicates the inside of tube 1 with fluid injection or discharge means (not shown).

Using a bellows allows compensation for at least partly for the longitudinal or transverse motions of the end of the rotating tube in relation to the stationary end box and to substantially maintain a sealed connection. However, annular plate 4 remains subjected to certain transverse motions. The gaskets are therefore subjected to torsional stresses and quickly lose their efficiency. A risk of the gaskets sticking with the stationary part being driven in rotation may occur.

FIG. 2 illustrates another prior art layout allowing sealed connection of a stationary box 2 at the top of a tubular element 1 rotating round an axis of rotation comprises a bellows 8 externally fastened to the tubular element, an annular ring 9 fastened to the end of the bellows, provided with a radial shoulder, an annular flange 10 forming a clip connected to stationary box 2 and likely to perform a certain radial motion in relation thereto, ring-type seals or gaskets 11 interposed between the annular ring and the flange, and elastic means 12 interposed between the stationary box and the flange which presses the annular flange 10 against the seal.

The reliability of the seals with the layout of FIG. 2 is much higher because the seals work in compression when the ring undergoes radial and longitudinal displacements at the end of the bellows, as a result of possible offsets or elongations of thermal origin of the tubular element. Such a layout is suitable for connection of tubes of relatively small diameter. It is however less advantageous for tubes of relatively large diameter because of the presence of the bellows that must be sufficiently reinforced to withstand the higher twisting moment exerted thereon. As it is thicker, it loses flexibility, which has a detrimental effect on the layout efficiency for compensating for the motions of the connected elements without sealing loss.

SUMMARY OF THE INVENTION

The rotating connection device according to the invention forms a seal between an inner element and an outer element of larger diameter than the inner element, the two elements being co-axial, cylindrically symmetric and rotating in relation to one another, while allowing relatively great longitudinal and radial motions between the two elements. The moving element can be, according to the individual case, the inner element, the outer element being stationary, or conversely the outer element, the inner element being stationary.

The device of the invention finds applications in many fields. An application thereof is described hereafter, by way of non limitative example, for connection to an outer pipe of a rotating system intended for heat exchange and/or incineration of gaseous effluents containing polluting substances, such as the system described in U.S. Pat. No. 5,643,538 or EP Patent 0,757,585 filed by the assignee.

The rotating connection device comprises a shell situated in the annular space between the two elements, at least a first ring-type seal secured to the shell, placed between the outer element and the inner element, at least a second ring-type seal placed between two opposite walls of the shell and of the outer element, both perpendicular to the axis of rotation, and means for pressing the two walls against one another by means of the ring-type seal with an adjustable application force.

The device preferably comprises two ring-type seals arranged in the shell and kept spaced out in relation to one another.

According to an embodiment, the two opposite walls respectively are a rim of the outer element and of a shoulder of the tubular part, and the means for pressing the two walls against one another by means of the second ring-type seal comprises an annular plate, springs and means cooperating with said rim so as to exert an adjustable compression (by screwing for example) on the springs.

According to an embodiment, the inner element is a stationary tubular pipe and the outer element is a rotating ring with a central opening into which the tubular pipe fits.

The device can be applied for example for heat fluid transfers between an outer device and the central part of the ring gear of a heat exchange and/or incineration system comprising an enclosure in which rotates the ring containing a mass of large heat exchange surface and means for establishing a permanent radial circulation of gaseous effluents, on the one hand between effluent delivery lines and the central zone via a first limited angular sector of the ring, and on the other hand between the central zone and effluent discharge lines via a second limited angular sector of the ring.

With this mode of connection, the pipe (inner element) can withstand relatively great motions, radial as well as longitudinal, without seal deterioration or sealing loss.

BRIEF DESCRIPTION OF THE DRAWINGS

Other features and advantages of the connection device according to the invention will be clear from reading the description hereafter of a non limitative example, applied to connection of a stationary pipe to a rotating element, with reference to the accompanying drawings wherein.

DETAILED DESCRIPTION OF THE INVENTION

Figure 1:
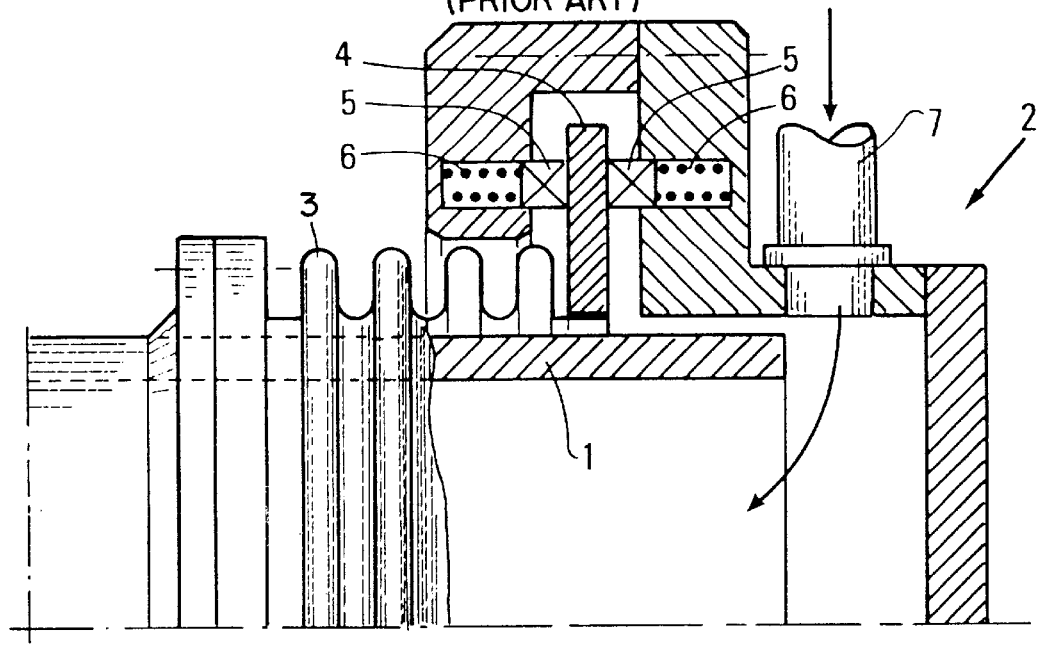
FIG. 1 is a partial cross-sectional view of a known device for connecting a rotating element to another, stationary element.
Figure 2:
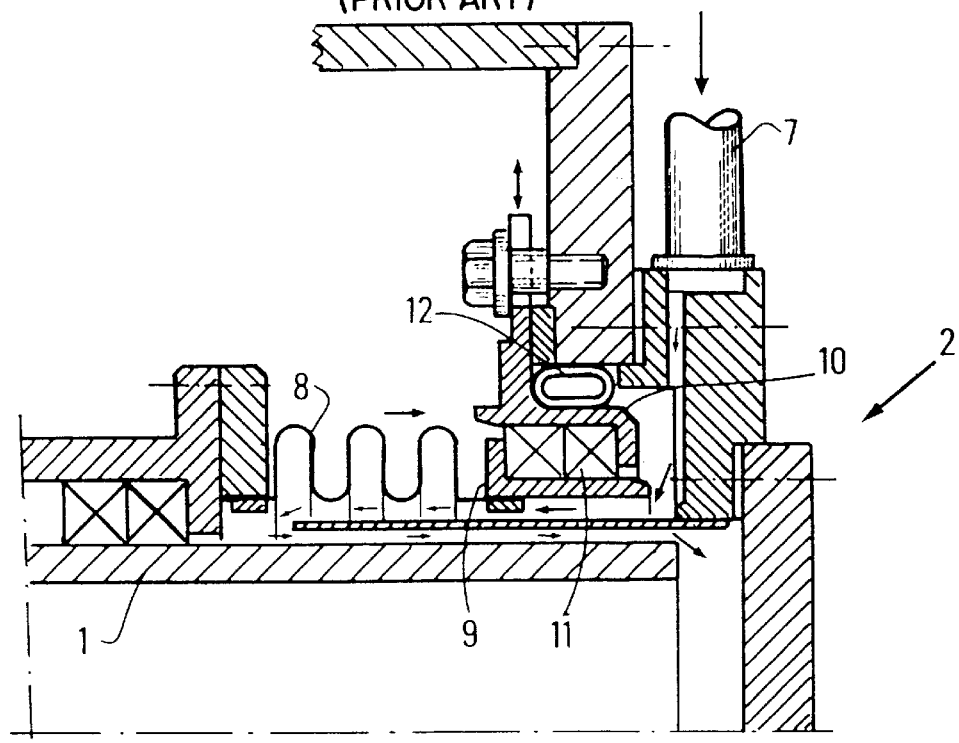
FIG. 2 is a partial cross-sectional view of another known device for connecting a rotating element to another, stationary element.
Figure 3:
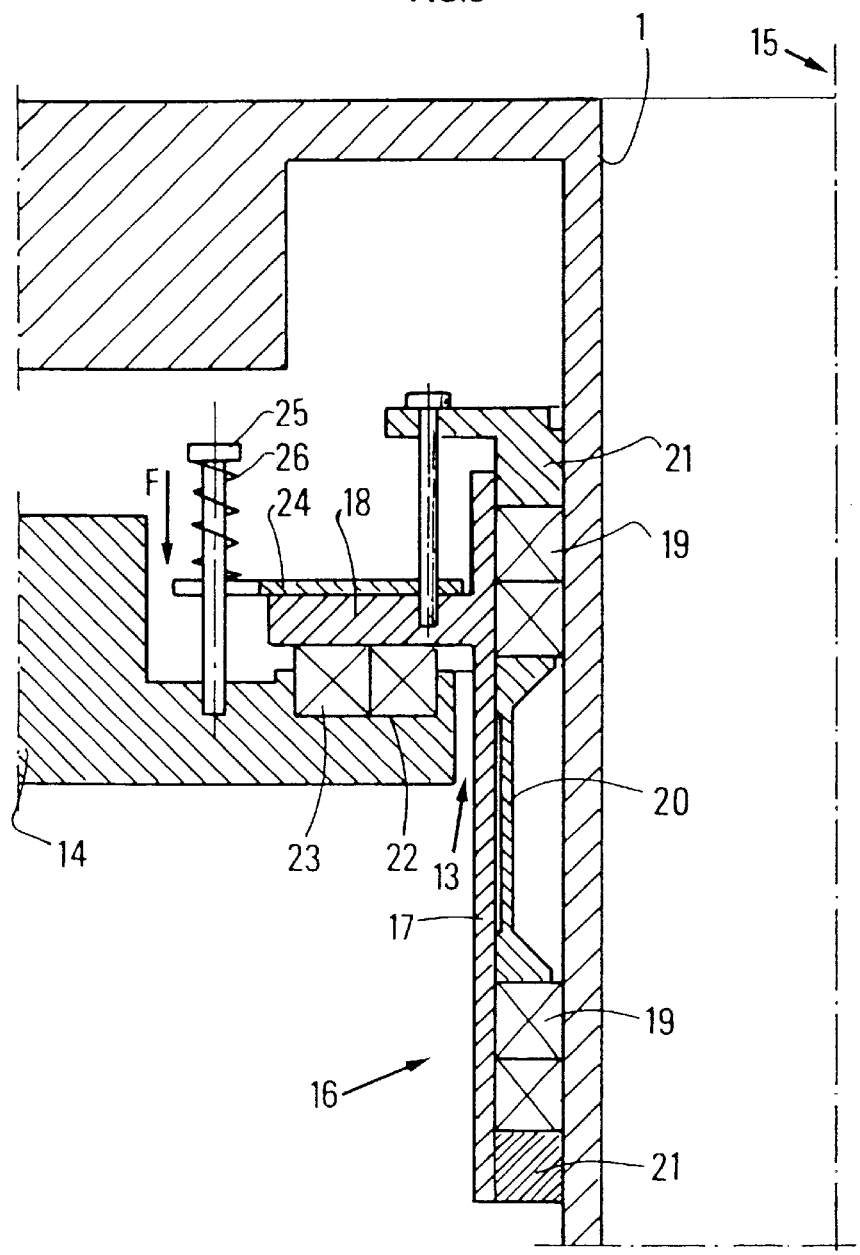
FIG. 3 is a partial cross-sectional view of the improved connection device according to the invention.
Figure 4:
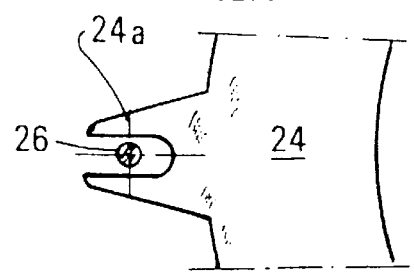
FIG. 4 is a partial cross-section, along F, of a preferred embodiment of a ring used for pressing seals in the device of FIG. 3.

The connection device provides a seal around a stationary tube 1 entering through the cylindrical central opening 13 of an element 14 rotating around a vertical axis 15 and that can follow radial and/or longitudinal displacements in relation to tube 1, as a result of possible offsets or thermal expansions. The section of tube 1 is smaller than the section of opening 13. A shell 16, with section is halfway between the section of the tube and that of opening 13, comprises a tubular part 17 ending in a shoulder 18, is arranged in the annular space around tube 1. Two gaskets 19, spaced out by a spacer ring 20, are situated in the annular space between tube 1 and shell 16. Two rings 21, made of bronze for example, are fastened to the opposite ends of the tubular part 17 of the shell to hold both gaskets 19 in position. The inner rim of element 14 comprises a hollow rail 22 for a ring-type seal 23. Shoulder 18 of the shell rests against ring-type seal 23. Shoulder 24 is held pressed against seal 23 by an annular ring 24 provided with split fingers 24a (FIG. 4). Ring 24 is immobilized in rotation by connectors 25 running through fingers 24A and screwed in element 14. The application force to ring 24 is obtained through springs 26 compressed by screwing of connectors 25. Shell 16 is therefore driven in rotation by element 14 and is kept separated from stationary tube 1 by interposed gaskets 19.

The shell clip fastening mode allows a certain radial motion of the shell in relation to the opening 13 of element 14. A possible axial sliding of tube 1 in relation to element 14 is also possible. Radial and axial motions cause no damage to gaskets 19 and to the ring-type seal that are tightly held in position in shell 16 and in circular rail 22 respectively. Fastening fingers 24A are dimensioned so as to break if the moment applied by the stationary element (tube 1) onto shell 16 accidentally exceeds a certain threshold, which represents security.

Figure 5:
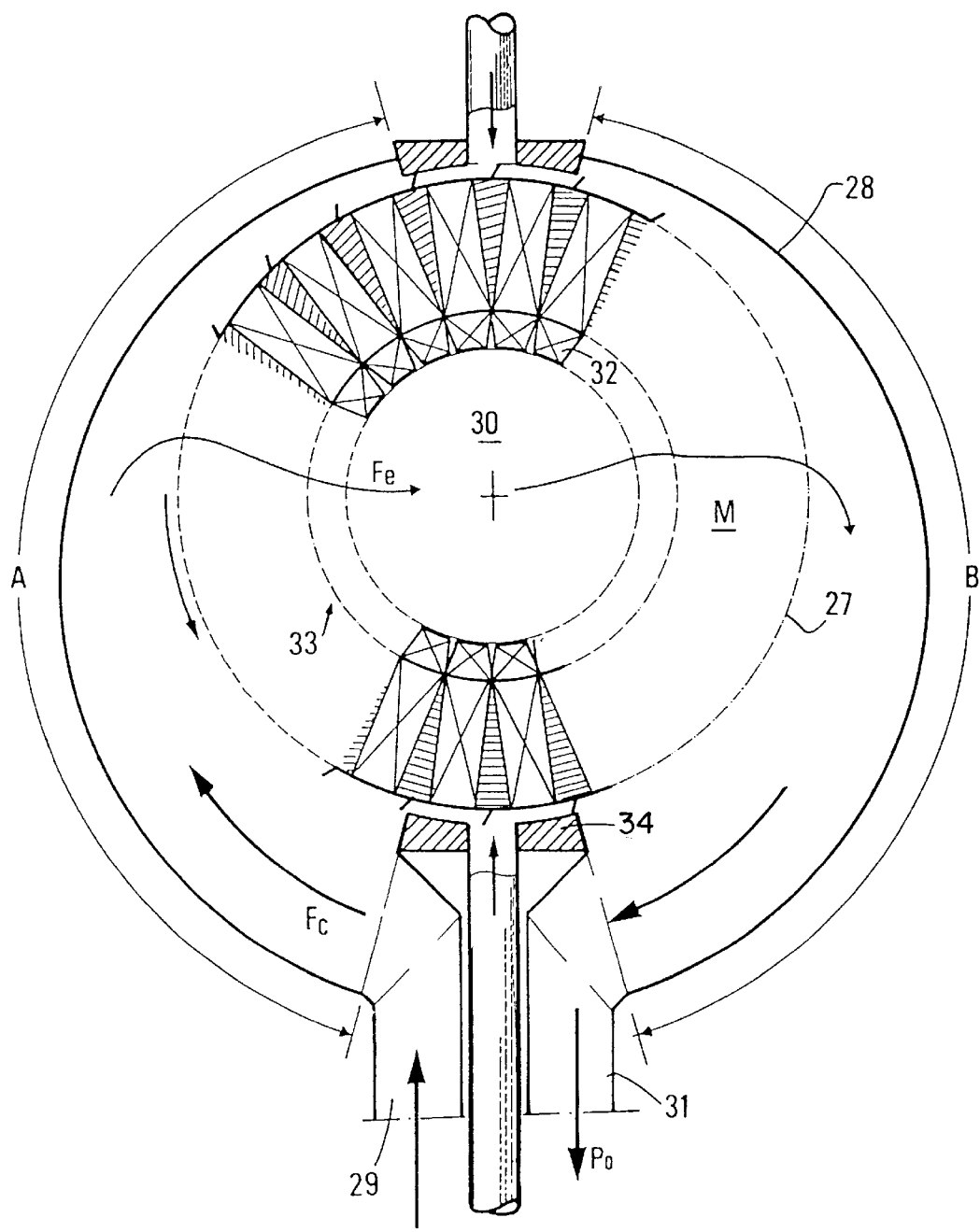
FIG. 5 shows an example of application of the connection mode of FIGS. 3, 4 for connection of a stationary pipe to the central opening of a rotating ring gear of a heat exchange and/or cleaning system.

This connection mode can be used for example in a heat exchange or cleaning system as shown in FIG. 5. This system comprises a ring 27 of vertical axis that can rotate within an enclosure 28. Ring 27 is internally chambered and contains a mass M having a great heat exchange surface. A permanent radial circulation of gaseous effluents is established on the one hand between effluent delivery lines 29 and central zone 30 via a first limited angular sector A of the ring, and on the other hand between the central zone and effluent discharge lines 31 via a second limited angular sector B of the ring. A thermal reactor 32 of catalyst bed type for example can be arranged in the central zone or against the inner face 33 of the ring for incineration of volatile organic compounds (VOC). Central zone 30 of the rotating ring 27 can be connected to a stationary line 34 used for example for channeling of gaseous crossflows when the system is used as a heat exchanger as described in the aforementioned U.S. Pat. No. 5,643,538 filed by the assignee, or for communication with a backup device outside the enclosure, either a burner or a fresh air source for example allowing the reaction temperature to be brought back within a determined temperature variation range.

The cross-section of line 34 is often relatively large to channel high gas flow rates. Its connection to the central zone must be suited for axial as well as radial motions due to possible offsets or expansions of thermal origin, within a wide temperature variation range. The connection device of the invention is particularly well-suited therefore, and its efficiency and reliability are proven.

What is claimed is:

1. A connection device which forms a seal between an inner element and a coaxial outer element with a central opening of a larger diameter than an outside diameter of the inner element which defines an annular space, the two elements rotating in relation to each another, allowing longitudinal and radial displacements between the two elements, the device comprising:

a shell arranged in the annular space between the two elements with an outside diameter smaller than the central opening, at least one first seal, placed between the shell and the inner element and secured to the shell, at least one second seal placed between two opposite walls of the shell and of the outer element, extending radially relative to an axis of rotation, and a securing device including a ring secured to the shell comprising split fingers, members and springs, the springs cooperating with the members and pressing onto the split fingers of the ring which press the two opposite walls against each other through the second seal with an adjustable application force while allowing radial displacements of the shell with respect to the outer element, through a displacement of the split fingers with respect to the members.

2. A device as claimed in claim 1 comprising:

a plurality of first seals which are separated axially between the shell and the inner element and secured to the shell.

3. A device as claimed in claim 2, wherein:

a spacer separates the first seals.

4. A device as claimed in claim 1, wherein:

the two opposite walls respectively are a rim of the outer element and of a shoulder of the shell, and the device which presses the two walls against one another through the second seal comprises an annular plate, springs and means, cooperating with the outer element, which exerts an adjustable compression on the springs.

* * * * *